US010581842B2

(12) United States Patent
Zavesky et al.

(10) Patent No.: US 10,581,842 B2
(45) Date of Patent: Mar. 3, 2020

(54) SEAMLESS AUTHENTICATION DEVICE (71) Applicants: Eric Zavesky, Austin, TX (US); James Pratt, Round Rock, TX (US); Nigel Bradley, McDonough, GA (US); Timothy Innes, Atlanta, GA (US); Nikhil Marathe, Palatine, IL (US); AT&T Intellectual Property I, L.P., Atlanta, GA (US)

(72) Inventors: Eric Zavesky, Austin, TX (US); James Pratt, Round Rock, TX (US); Nigel Bradley, McDonough, GA (US); Timothy Innes, Atlanta, GA (US); Nikhil Marathe, Palatine, IL (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 369 days.

(21) Appl. No.: 15/473,814

(22) Filed: Mar. 30, 2017

(65) Prior Publication Data
US 2018/0288041 A1 Oct. 4, 2018

(51) Int. Cl.
H04L 29/06 (2006.01)
H04L 9/32 (2006.01)

(52) U.S. Cl.
CPC ........ *H04L 63/0861* (2013.01); *H04L 9/3231* (2013.01); *H04L 63/0815* (2013.01); *H04L 2209/38* (2013.01)

(58) Field of Classification Search
CPC ............. H04L 63/0861; H04L 9/3231; H04L 63/0815; G06K 9/00892; G06K 2009/00939
See application file for complete search history.

(56) References Cited

U.S. PATENT DOCUMENTS 8,082,591 B2 12/2011 Gu et al.
8,261,327 B2 9/2012 Keeler et al.
(Continued)

FOREIGN PATENT DOCUMENTS

WO WO 2011062364 5/2011
WO WO 2015054853 4/2015
WO WO 2016123030 8/2016

OTHER PUBLICATIONS

Continuous Authentication Using Biometrics: Data, Models, and Metrics by Issa Traore and Ahmed Awad E. Ahmed (abstract only)—2011.
(Continued)

*Primary Examiner* — Kambiz Zand
*Assistant Examiner* — Tongoc Tran
(74) *Attorney, Agent, or Firm* — Hartman & Citrin LLC (57) ABSTRACT According to one embodiment, an authentication system includes an authentication device. The authentication device includes a biometric scanner, a processor, and an interface. The biometric scanner receives biometric data for a user. The processor authenticates the user by comparing the received biometric data for the user to predetermined biometric information for the user. The processor generates an authentication token in response to the authentication. The processor continuously authenticates the user. The interface communicates the authentication token to a content providing device, the authentication token indicating the authentication of the user. The interface receives content from the content providing device in response to the authentication token.

19 Claims, 3 Drawing Sheets

(56) References Cited

U.S. PATENT DOCUMENTS

| | | | |
|---|---|---|---|
| 8,370,639 B2 | 2/2013 | Azar et al. | |
| 8,594,628 B1 | 11/2013 | Schroeder et al. | |
| 8,909,938 B2 | 12/2014 | Azar et al. | |
| 8,914,848 B2 | 12/2014 | Castro et al. | |
| 8,925,044 B2 | 12/2014 | Woodward et al. | |
| 9,392,460 B1 | 7/2016 | Blake et al. | |
| 9,444,816 B2 | 9/2016 | Johnsgard et al. | |
| 9,769,310 B2* | 9/2017 | Hodge | H04M 17/01 |
| 2010/0077467 A1 | 3/2010 | Satagopan et al. | |
| 2010/0115610 A1* | 5/2010 | Tredoux | G06F 21/316 |
| | | | 726/19 |
| 2011/0000961 A1* | 1/2011 | McNeal | G06Q 20/042 |
| | | | 235/382 |
| 2012/0214443 A1* | 8/2012 | Daigle | H04L 9/3228 |
| | | | 455/411 |
| 2013/0133055 A1* | 5/2013 | Ali | H04L 63/0861 |
| | | | 726/7 |
| 2013/0191929 A1 | 7/2013 | Yin et al. | |
| 2014/0047560 A1 | 2/2014 | Meyer et al. | |
| 2014/0283016 A1* | 9/2014 | Sambamurthy | G06F 21/31 |
| | | | 726/19 |
| 2014/0316984 A1 | 10/2014 | Schwartz | |
| 2014/0354405 A1 | 12/2014 | Kocher et al. | |
| 2015/0135310 A1* | 5/2015 | Lee | A61B 5/681 |
| | | | 726/20 |
| 2015/0242605 A1 | 8/2015 | Du et al. | |
| 2015/0242894 A1* | 8/2015 | Gopal | G06Q 30/0256 |
| | | | 705/14.54 |
| 2015/0304851 A1* | 10/2015 | Chen | H04W 4/80 |
| | | | 713/172 |
| 2015/0326561 A1 | 11/2015 | Shah et al. | |
| 2015/0363582 A1 | 12/2015 | Sheller et al. | |
| 2016/0087954 A1 | 3/2016 | Zhang | |
| 2016/0127351 A1* | 5/2016 | Smith | G06F 21/316 |
| | | | 726/10 |
| 2016/0182503 A1 | 6/2016 | Cheng et al. | |
| 2016/0226666 A1 | 8/2016 | Quirk et al. | |
| 2016/0239649 A1 | 8/2016 | Zhao | |
| 2016/0286394 A1 | 9/2016 | Iyer et al. | |
| 2016/0292408 A1* | 10/2016 | Zhang | G06F 21/32 |
| 2016/0308980 A1 | 10/2016 | Singh et al. | |
| 2016/0359850 A1 | 12/2016 | Weiss | |
| 2018/0007060 A1* | 1/2018 | Leblang | H04L 63/105 |
| 2019/0122208 A1* | 4/2019 | Richardson | G06Q 20/0658 |

OTHER PUBLICATIONS

A Review of Continuous Authentication Using Behavioral Biometrics by Ioannis C. Stylios, Olga Thanou, Iosif Androulidakis and Elena Zaitseva (abstract only)—2016.

A Roadmap to Continuous Biometric Authentication on Mobile Devices by Marlies Rybnicek, Christoph Lang-Muhr; Daniel Haslinger (abstract only)—2014.

Continuous User Authentication Using Temporal Information by Koichiro Niinumaand Anil K. Jain—2010.

Continuous Mobile Authentication Using Touchscreen Gestures by Tao Feng et al.—2012.

NTT Docomo Deploying Federated, Mobile Identity; Deployment includes handset with iris recognition by Zack Martin—May 28, 2015.

Aaron Jaech; Continuous Biometric Authentication; Mar. 1, 2012; YouTube; https://www.youtube.com/watch?v=LKI4Jm9aqB8.

* cited by examiner

SEAMLESS AUTHENTICATION DEVICE

TECHNICAL FIELD

The present disclosure relates generally to authentication and more particularly to a seamless authentication device.

BACKGROUND

Users may be authenticated before receiving access to content. When a user receives content from more than one device, the user may be required to communicate authentication information to each device.

Authenticating users across a plurality of devices presents several technical challenges. A user may access content using different devices. For example, a user may access video content, audio content, and/or textual content using a television, a smartphone, a tablet, a laptop, and desktop, and/or any other suitable device that communicates content to the user. Accessing the content may require a subscription. To confirm that a user has a subscription to access content, the user may provide an identity authentication. A user may be required to manually provide authentication information to each device. Furthermore, a system may not know when a user is no longer consuming content using the device, thus allowing unauthorized users to consume content using an authenticated user's authentication information.

SUMMARY

According to one embodiment, an authentication system includes an authentication device. The authentication device includes a biometric scanner, a processor, and an interface. The biometric scanner receives biometric data for a user. The processor authenticates the user by comparing the received biometric data for the user to predetermined biometric information for the user. The processor generates an authentication token in response to the authentication. The processor authenticates the user. The interface communicates the authentication token to a content providing device, the authentication token indicating the authentication of the user. The interface receives content from the content providing device in response to the authentication token.

In another embodiment, a method includes: receiving, using a first biometric scanner, biometric data for a first user; authenticating the first user by comparing the received biometric data for the first user to predetermined biometric information for the first user; generating a first authentication token in response to the authentication; continuously authenticating the first user; communicating the first authentication token to a first content providing device, the first authentication token indicating the authentication of the first user; and receiving content from the first content providing device in response to the first authentication token.

In some embodiments, an authentication device authenticates a user's identity and propagates an authentication token to nearby devices through federation. Propagating an authentication token increases network security by allowing devices to confirm that a user is authorized to access the device. Authentication tokens may also be encoded or encrypted to obfuscate and mask information being communicated across a network. Masking the information being communicated protects users and their information in the event of unauthorized access to the network and/or data occurs.

In some embodiments, the authentication device continuously authenticates the user. Continuously authenticating a user's identity ensures that an authorized user is receiving content, thus increasing network security by ensuring that an unauthorized user is not accessing the device using an authorized user's authentication token. Furthermore, continuous authentication offers cues that allow differentiation of members of a group. This facilitates providing content suitable to different device users.

BRIEF DESCRIPTION OF THE DRAWINGS

To assist in understanding the present disclosure, reference is now made to the following brief description, taken in connection with the accompanying drawings, in which.

DETAILED DESCRIPTION

This disclosure contemplates a seamless authentication device that continuously authenticates a user's identity and propagates the identity confirmation to nearby devices through federation. A seamless authentication device automatically confirms a user's identity. Furthermore, the seamless authentication device may continuously authenticate a user's identity by determining when an authenticated user is no longer associated with the content providing device. This allows increased network security by authenticating users and determining which user is associated with a content providing device at a particular time. Furthermore, in some embodiments, knowing which user is consuming content on a particular device allows a system to generate more accurate user profiles.

Figure 1:
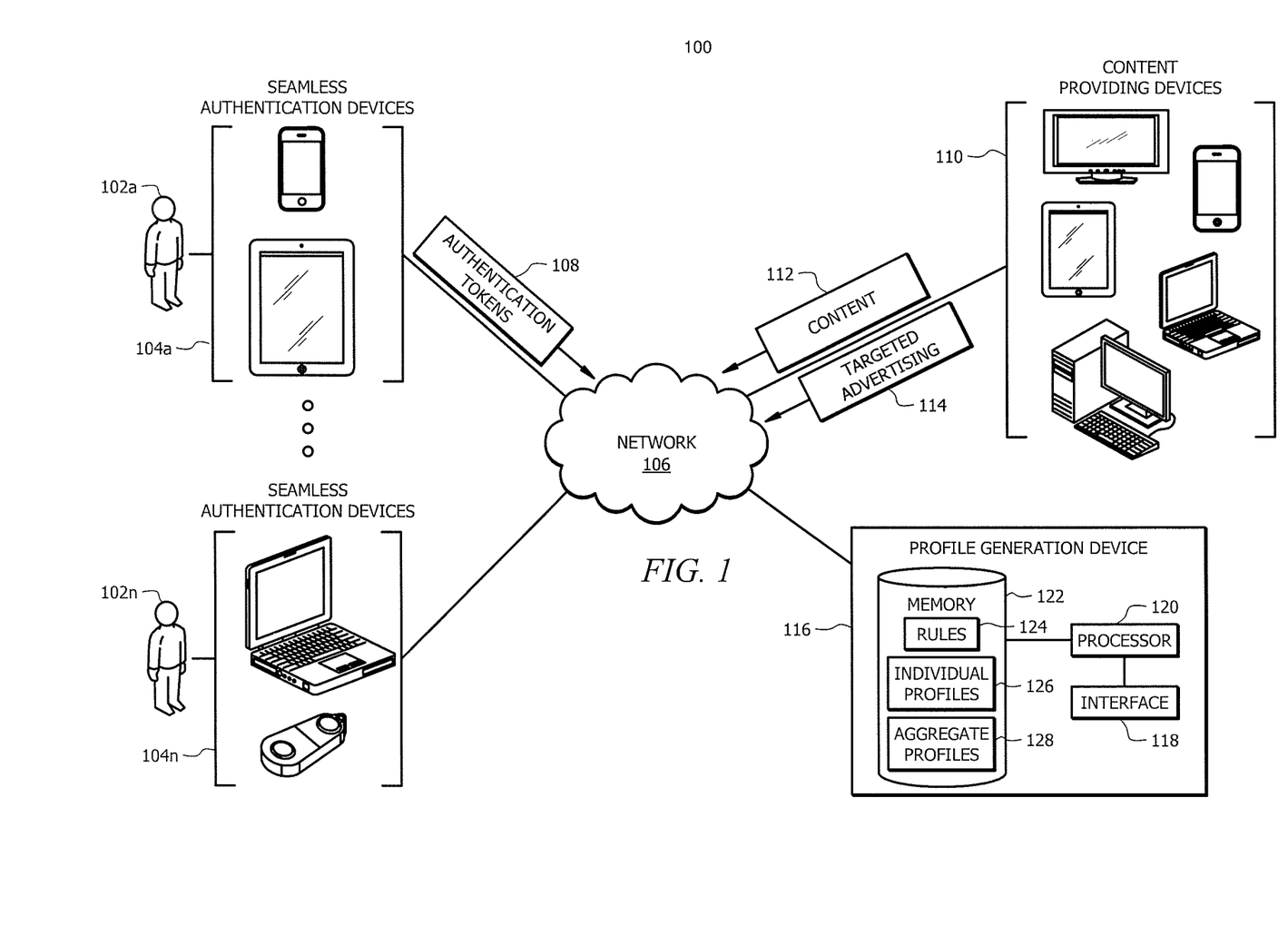
FIG. 1 illustrates a system for seamless authentication, in certain embodiments.

FIG. 1 illustrates a system 100 configured to perform authentication. Generally, system 100 facilitates authenticating users and generating profiles for users and/or groups of users. As illustrated in FIG. 1, system 100 includes one or more users 102, one or more seamless authentication devices 104, one or more content providing devices 110, and profile generation device 116 communicatively coupled by network 106.

In the illustrated embodiment, system 100 includes users 102a-n. System 100 may include one user 102 or any suitable number of users 102. User 102 generally uses a seamless authentication device to authenticate user 102's identity. For example, user 102 may be a subscriber such as a cable subscriber, a satellite subscriber, a social media subscriber, a streaming service subscriber, and/or a subscriber of any other service. User 102 may be a paid subscriber or an unpaid subscriber to one or more services. User 102 may utilize seamless authentication device 104 to access content.

Seamless authentication device 104 generally authenticates user 102 and provides the authentication to content providing devices 110. FIG. 1 illustrates several example seamless authentication devices 104. System 100 may include a single seamless authentication device 104 or any suitable number of seamless authentication devices 104. In some embodiments, each user 102 is associated with a seamless authentication device 104. In other embodiments, a plurality of users 102 are associated with a single seamless authentication device 104. In some embodiments, a single user 102 may be associated with a plurality of seamless authentication devices 104. Seamless authentication device 104 may be any device that operates and/or communicates with other components of system 100. Seamless authentication device 104 generally generates authentication tokens upon confirming user 102's identity and communicates the authentication tokens to content providing devices 110 and/or profile generation device 116.

As an example and not by way of limitation, seamless authentication device 104 may be a smart phone, a computer, a laptop, a wireless or cellular telephone, an electronic notebook, a personal digital assistant, a tablet, a key fob, a wearable device (e.g., a smart watch or any other type of wearable), an internet of things ("IoT") device, or any other device capable of receiving and/or communicating information with other components of system 100. Seamless authentication device 104 may include a biometric scanner to facilitate authenticating one or more users 102. Seamless authentication device 104 is discussed in more detail in the disclosure related to FIG. 2.

In particular embodiments, seamless authentication device 104 generates authentication tokens 108. Generally, an authentication token 108 indicates that a user 102's identity is confirmed. For example, seamless authentication device 104 may generate authentication token 108 in response to confirming a user 102's identity. Seamless authentication device 104 may transmit an authentication token 108 to one or more content providing devices 110, profile generation device 116, and/or any other suitable component of system 100. In some embodiments, authentication tokens 108 are encoded or encrypted to obfuscate and mask information being communicated across a network. Masking the information being communicated protects users and their information in the event of unauthorized access to the network and/or data.

Network 106 facilitates communication between and amongst the various components of system 100. This disclosure contemplates network 106 being any suitable network operable to facilitate communication between the components of system 100. Network 106 may include any interconnecting system capable of transmitting audio, video, signals, data, messages, or any combination of the preceding. Network 106 may include all or a portion of an ad hoc network, an intranet, an extranet, a virtual private network ("VPN"), LAN, a wireless LAN ("WLAN"), a WAN, a wireless WAN ("WWAN"), a metropolitan area network ("MAN"), a portion of the Internet, a portion of the Public Switched Telephone Network ("PSTN"), a cellular telephone network, including combinations thereof, operable to facilitate communication between the components. Network 106 may include one or more wireline (such as, for example, Digital Subscriber Line ("DSL)" or Data Over Cable Service Interface Specification ("DOCSIS")), wireless (such as, for example, 2G, 3G, 4G, or 5G cellular, Wi-Fi, or Worldwide Interoperability for Microwave Access ("WiMAX")), or optical (such as, for example, Synchronous Optical Network ("SONET") or Synchronous Digital Hierarchy ("SDH")) links, including combinations thereof.

Content providing devices 110 generally communicate content 112 and/or targeted advertising 114 to one or more users 102. Content 112 may be any suitable content that user 102 consumes. For example, and not by way of limitation, content 112 may include video content such as movie content, television programming content, music video content, or any other suitable type of video content. Content 112 may include audio content such as music content, talk show content, audiobook content or any other suitable type of audio content. Content 112 may include textual content such as social media content, news content, internet content, or any other suitable type of content. Content 112 may include any combination of video content, music content, textual content, and any other suitable type of content.

Targeted advertising 114 is generally advertising content tailored for user 102 and/or group of users 102. Targeted advertising 114 may be video advertising, audio advertising, and/or textual advertising. For example, and not by way of limitation, targeted advertising 114 may include a television commercial, radio commercial, webpage advertisement, pop-up advertisement, or any other suitable type of advertisement.

Each of the content providing devices 110 may be any suitable device for communicating content 112 and/or targeted advertising 114 to user 102 and/or any component of system 100. For example, a content providing device 110 may be a television, a smart television, a computer monitor, a smart phone, a desktop, a laptop, a projector, an augmented reality device, a virtual reality device, a radio, a speaker system, and/or any other suitable type of device. In some embodiments, a content providing device 110 may include more than one device, for example, a television and a set-top box. As another example, content providing device 110 may include a speaker system and a radio antenna. In some embodiments, a seamless authentication device 104 and a content providing device 110 may be combined as a single device. For example, user 102 may utilize a smart phone that performs the functionality of both seamless authentication device 104 and content providing device 110. In some embodiments, content providing device 110 may communicate content 112 and/or a summary of content 112 to profile generation device 116 to facilitate generating profiles for one or more users 102.

Profile generation device 116 generally generates individual profiles for users 102 and/or aggregate profiles for two or more users 102. In the illustrated embodiment, profile generation device 116 includes interface 118, processor 120, and memory 122. Interface 118 represents any suitable device operable to receive information from network 106, transmit information through network 106, perform suitable processing of the information, communicate with components of system 100 and/or other devices, or any combination of the preceding. For example, interface 118 may receive authentication token 108 from seamless authentication device 104. As another example, interface 118 may receive content 112 and/or a summary of content 112 from content providing device 110 or any other suitable device. As yet another example, interface 118 communicates targeted advertising 114 to content providing device 110. Interface 118 represents any port or connection, real or virtual, including any suitable hardware and/or software, including protocol conversion and data processing capabilities, to communicate through a LAN, WAN, or other communication systems that allows profile generation device 116 to exchange information with seamless authentication device 104, content providing device 110, and/or and other component of system 100 directly and/or via network 106. Interface 118 is not limited to a single interface and may encompass multiple interfaces.

Processor 120 is any electronic circuitry, including, but not limited to microprocessors, application specific integrated circuits (ASIC), application specific instruction set processor (ASIP), and/or state machines, that communicatively couples to memory 122 and interface 118 and controls the operation of profile generation device 116. Processor 120 may be 8-bit, 16-bit, 32-bit, 64-bit or of any other suitable architecture. Processor 120 may include an arithmetic logic unit (ALU) for performing arithmetic and logic operations, processor registers that supply operands to the ALU and store the results of ALU operations, and a control unit that fetches instructions from memory 122 and executes them by directing the coordinated operations of the ALU, registers and other components. Processor 120 may include other hardware and software that operates to control and process information. Processor 120 executes software stored on memory 122 to perform any of the functions described herein. Processor 120 controls the operation and administration of profile generation device 116 by processing information received from network 106, seamless authentication device 104, content providing device 110, and/or any other suitable component of system 100. Processor 120 may be a programmable logic device, a microcontroller, a microprocessor, any suitable processing device, or any suitable combination of the preceding. Processor 120 is not limited to a single processing device and may encompass multiple processing devices.

Memory 122 may store, either permanently or temporarily, data, operational software, or other information for processor 120. Memory 122 may be a computer-readable non-transitory storage medium, in some embodiments. Memory 122 may include any one or a combination of volatile or non-volatile local or remote devices suitable for storing information. For example, memory 122 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 122, a disk, a CD, or a flash drive. In particular embodiments, the software may include an application executable by processor 120 to perform one or more of the functions described herein. In particular embodiments, memory 122 may store rules 124, individual profiles 126, aggregate profiles 128, and/or any other suitable information. This disclosure contemplates memory 122 storing any of the elements stored in seamless authentication device 104, content providing device 110, and/or any other suitable components of system 100.

Memory 122 may include rules 124. Rules 124 generally refer to logic, rules, algorithms, codes, tables, and/or other suitable instructions embodied in a computer-readable storage medium for the operation of profile generation device 116. For example, rules 124 may include rules and/or other instructions to facilitate generating and/or dynamically revising individual profiles 126 and/or aggregate profiles 128. As another example, rules 124 may facilitate generating targeted advertising 114. For example, profile generation device 116 may generate targeted advertising 114 using individual profiles 126 and/or aggregate profiles 128.

Each of the individual profiles 126 generally indicates information for a single user 102. For example, an individual profile 126 may be a user profile for user 102. Individual profile 126 may include an identification of user 102. In some embodiments, individual profile 126 may indicate content 112 consumed by user 102. Individual profile 126 may indicate times when user 102 consumes content 112. For example, individual profile 126 may indicate user 102's content consumption at particular times of the day, particular days of the week, particular weeks of the month, particular months of the year, or any other suitable time period. Individual profile 126 may indicate that user 102 consumes particular content 112 at particular times. Individual profile 126 may include the type of content 112 that user 102 consumes, in some embodiments. Individual profile 126 may indicate that user 102 consumes content with other users 102. Individual profile 126 may include any suitable information for user 102 and user 102's content consumption habits. In some embodiments, individual profile 126 is stored using a blockchain. For example, some or all of the information included in individual profile 126 may be included in a block of a blockchain. For example, the information may be hashed and/or encoded to generate a block for a blockchain.

Aggregate profiles 128 are generally profiles for a group of users 102. For example, aggregate profiles 128 may indicate that a group of users 102 have consumed content 112 together. Friends, family members, coworkers, and/or any other suitable group of users 102 may consume content 112 together. For example, a group may watch movies and/or television shows together and/or listen to music together, in some embodiments. Profile generation device 116 may generate aggregate profile 128 for the group of users 102. Aggregate profile 128 may include the same information as individual profiles 126, with the difference that the information pertains to a group of users 102, rather than a single user 102. In some embodiments, aggregate profile 128 is stored using a block chain.

Modifications, additions, or omissions may be made to system 100 without departing from the scope of the disclosure. For example, system 100 may include any number of users 102, seamless authentication devices 104, content providing devices 110, and/or profile generation devices 116. System 100 may include any number of interfaces 118, processor 120, and/or memory 122. Furthermore, the components of system 100 may be integrated or separated. For example, in particular implementations, seamless authentication devices 104, content providing device 110, and/or profile generation device 116 may be combined as a single component. As shown as the components of system 100 communicating through network 106, any component of system 100 may communicate directly with any other component.

Figure 2:
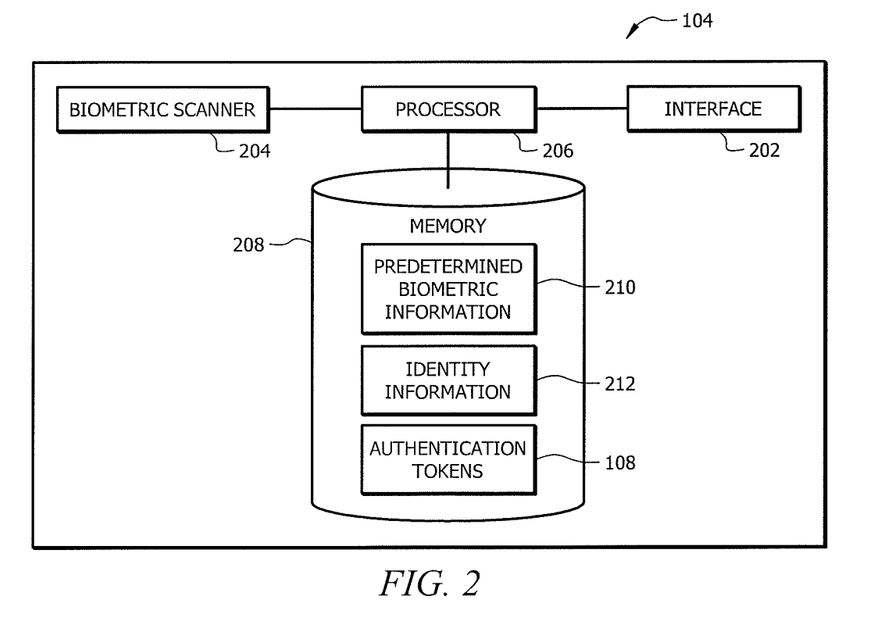
FIG. 2 illustrates a seamless authentication device of the system of FIG. 1, in certain embodiments.

FIG. 2 illustrates a seamless authentication device 104 of system 100 of FIG. 1, in certain embodiments. Generally, seamless authentication device 104 authenticates user 102's identity and communicates authentication token 108 to content providing device 110 and/or profile generation device 116. In some embodiments, seamless authentication device 104 receives content 112 and/or targeted advertising 114. In other embodiments, seamless authentication device 104 is included within content providing device 110. Content providing device 110 may communicate content 112 and/or targeted advertising 114 through network 106, in some embodiments. Content providing device 110 may communicate content 112 and/or targeted advertising 114 directly to user 102. For example, content providing device 110 may display content 112 and/or targeted advertising 114 to user 102, in some embodiments. In the illustrated embodiment, seamless authentication device 104 includes interface 202, processor 206, memory 208, and biometric scanner 204. Seamless authentication device 104 increases network security by continuously authenticating (or re-authenticating) a user's identity. For example, seamless authentication device 104 may re-authenticate user 102's identity at predetermined time periods while user 102 consumes content 112. For example, seamless authentication device 104 may re-authenticate user 102 every millisecond, every second, every minute, or any other predetermined time period. By re-authenticating user 102 at a predetermined time period, authentication device 104 continuously authenticates user 102 while user 102 consumes content 112. As another example, seamless authentication device 104 may authenticate user 102 throughout a predetermined range of periodic intervals. As yet another example, seamless authentication device 104 may authenticate user 102 upon a change in condition (e.g., a change in location of seamless authentication device 104 and/or or completion of all or a portion of content 112 such as the end of a song or end of a video).

Interface 202 represents any suitable device operable to receive information from network 106, transmit information through network 106, perform suitable processing of the information, communicate with components of system 100 and/or other devices, or any combination of the preceding. For example, interface 202 communicates authentication token 108 to content providing device 110 and/or profile generation device 116. As another example, interface 202 receives user inputs. For example, interface 202 may receive authentication information from user 102. Interface 202 represents any port or connection, real or virtual, including any suitable hardware and/or software, including protocol conversion and data processing capabilities, to communicate through a LAN, WAN, or other communication systems that allows seamless authentication device 104 to exchange information with profile generation device 116, content providing device 110, and/or other components of system 100 directly and/or via network 106. Interface 202 is not limited to a single interface and may encompass multiple interfaces.

Processor 206 is any electronic circuitry, including, but not limited to microprocessors, ASIC, ASIP, and/or state machines, that communicatively couples to memory 208 and interface 202 and controls the operation of seamless authentication device 104. Processor 206 may be 8-bit, 16-bit, 32-bit, 64-bit or of any other suitable architecture. Processor 206 may include an ALU for performing arithmetic and logic operations, processor registers that supply operands to the ALU and store the results of ALU operations, and a control unit that fetches instructions from memory 208 and executes them by directing the coordinated operations of the ALU, registers and other components. Processor 206 may include other hardware and software that operates to control and process information. Processor 206 executes software stored on memory 208 to perform any of the functions described herein. Processor 206 controls the operation and administration of seamless authentication device 104 by processing information received from network 106, profile generation device 116, content providing device 110, and/or any other suitable component of system 100. Processor 206 may be a programmable logic device, a microcontroller, a microprocessor, any suitable processing device, or any suitable combination of the preceding. Processor 206 is not limited to a single processing device and may encompass multiple processing devices.

Examples of biometric scanner 204 include, but are not limited to, retina scanners, finger print scanners, heart rate monitors, voice print scanners, cameras, fragrance detectors, facial recognition devices, gesture recognition cameras, height determination devices, and walking gait authentication devices Biometric scanner 204 is configured to capture information about a person's physical characteristics and to output the physical characteristics as identity information 212. Identity information 212 may include information to uniquely identify a person based on their physical characteristics. For example, biometric scanner 204 may be configured to perform a retinal scan of the user's eye. As another example, biometric scanner 204 may be configured to perform a fingerprint scan of the user's finger.

Memory 208 may store, either permanently or temporarily, data, operational software, or other information for processor 206. Memory 208 may be a computer-readable non-transitory storage medium, in some embodiments. Memory 208 may include any one or a combination of volatile or non-volatile local or remote devices suitable for storing information. For example, memory 208 may include RAM, ROM, magnetic storage devices, optical storage devices, or any other suitable information storage device or a combination of these devices. The software represents any suitable set of instructions, logic, or code embodied in a computer-readable storage medium. For example, the software may be embodied in memory 208, a disk, a CD, or a flash drive. In particular embodiments, the software may include an application executable by processor 206 to perform one or more of the functions described herein. In particular embodiments, memory 208 may store predetermined biometric information 210, identity information 212, authentication token 108, and/or any other suitable information. This disclosure contemplates memory 208 storing any of the elements stored in content providing device 110, profile generation device 116, and/or any other suitable components of system 100.

Memory 208 may include predetermined biometric information 210 for one or more users 102. Predetermined biometric information 210 generally includes information for the physical characteristics of one or more users 102. Predetermined biometric information 210 may be used to facilitate authenticating user 102's identity. For example, processor 206 may compare predetermined biometric information 210 to identity information 212 received from biometric scanner 204.

Identity information 212 generally facilitates authenticating user 102. Identity information 212 may include physical characteristic information for user 102, in some embodiments. For example, biometric scanner 204 may generate identity information 212 to store in memory 208. In some embodiments, interface 202 receives identity information 212. For example, user 102 may provide information to seamless authentication device 104. For example, user 102 may provide a username and password or any other type of identifying information to seamless authentication device 104 via interface 202 before the information is stored as identity information 212.

As previously discussed in the disclosure related to FIG. 1, authentication token 108 indicates that user 102's identity is confirmed. For example, seamless authentication device 104 may generate authentication token 108 in response to confirming user 102's identity. Seamless authentication device 104 may transmit authentication token 108 to one or more content providing devices 110, profile generation device 116, and/or any other suitable component of system 100. In some embodiments, authentication token 108 is encoded or encrypted to obfuscate and mask information being communicated across network 106. Masking the information being communicated protects users and their information in the event of unauthorized access to the network and/or data. Memory 208 may include one authentication token 108 or any suitable number of authentication tokens 108. In some embodiments, memory 208 includes an authentication token 108 for each user 102 associated with seamless authentication device 104. In some embodiments, authentication token 108 indicates a time that seamless authentication device 104 confirmed user 102's identity. In these embodiments, seamless authentication device 104 may update the time in authentication token 108 before communicating authentication token 108 to content providing device 110 and/or profile generation device 116. In some embodiments, processor 206 generates a new authentication token 108 each time user 102's identity is confirmed. Seamless authentication device 104 may not store authentication token 108, in certain embodiments.

In some embodiments, authentication token 108 may include an identification of seamless authentication device 104. For example, authentication token 108 may include a media access control ("MAC") address and/or an international mobile station equipment identity ("IMEI") for seamless authentication device 104. Authentication token 108 may include any suitable type of information to identify seamless authentication device 104. Thus, authentication token 108 identifies user 102, seamless authentication device 104, and a time that user 102 is using seamless authentication device 104.

In some embodiments, authentication token 108 may include user 102's location. For example, content providing device 110 may determine that user 102 is near content providing device 110 before communicating content 112, in some embodiments. Including user 102's location in authentication token 108 may prevent spoofing content providing device 110 by providing authentication token 108 when user 102 is not near content providing device 110. Seamless authentication device 104 may identify user 102's location through federated network services. For example, seamless authentication device 104 may use one or more edge nodes to prevent using a virtual private network. Seamless authentication device 104 may use any suitable technique to determine user 102's location.

In an exemplary embodiment of operation, first seamless authentication device 104 authenticates first user 102. For example, first seamless authentication device 104 may receive biometric data for first user 102 and compare the received biometric data to predetermined biometric information 210 for first user 102. As another example, interface 202 of seamless authentication device 104 may receive input (e.g., from first user 102 or any other suitable person or component) to confirm first user 102's identity. First seamless authentication device 104 generates authentication token 108 for first user 102 in response to authenticating first user 102. Authentication token 108 may include an identification of first seamless authentication device 104, as previously discussed.

Interface 202 of first seamless authentication device 104 propagates authentication token 108 to first content providing device 110 through federation. For example, interface 202 may propagate authentication token 108 across different security domains, and device 110 may receive authentication token 108. For example, first seamless authentication device 104 may continuously propagate authentication token 108. In some embodiments, interface 202 receives a request for authentication from an interface of content providing device 110. For example, interface 202 may receive a request in response to first user 102 requesting to consume content 112 using content providing device 110. Seamless authentication device 104 may generate authentication token 108 in response to the request.

Interface 202 communicates authentication token 108 to a content providing device 110. Content providing device 110 receives authentication token 108 and communicates content 112 to the first user 102 in response to authentication token 108. For example, content providing device 110 may include a processor that determines whether first user 102 is a subscriber and communicates content 112 in response to determining that first user 102 is a subscriber or otherwise authorized to consume content 112. In some embodiments, seamless authentication device 104 may automatically communicate an authentication upon a determination that authentication device 104 is within a predetermined distance from a content providing device 110. As seamless authentication device 104 moves and comes within a predetermined distance of different content providing devices 110, seamless authentication device 104 may propagate authentication token 108 automatically. Thus, authentication device 104 may seamlessly authenticate user 102 to content providing devices 110 as user 102 moves between locations.

In some embodiments, content providing device 110 may require receipt of authentication token 108 within a predetermined preceding amount of time to communicate content 112. For example, content providing device 110 may communicate content 112 for 1 minute, 5 minutes, 30 minutes, or any other suitable amount of time after receiving authentication token 108. In some embodiments, content providing device 110 may cease communicating content 112 after the predetermined amount of time unless it receives a new authentication token 108.

In some embodiments, seamless authentication device 104 continuously authenticates first user 102. Seamless authentication device 104 may continuously authenticate first user 102 by authenticating first user 102 at predetermined time intervals. For example, seamless authentication device 104 may authenticate user 102 every 30 seconds, one minute, five minutes, fifteen minutes, or any suitable amount of time. In some embodiments, the predetermined amount of time may be based on content 112 that first user 102 is consuming and/or content providing device 110. For example, if first user 102 is consuming content 112 that is music, seamless authentication device 104 may authenticate first user 102 after each song is played. As another example, seamless authentication device 104 may authenticate first user 102 more often if content providing device 110 is in a public area (e.g., a television in a sports bar) compared to a private area (e.g., first user's 102 living room). In some embodiments, seamless authentication device 104 may communicate authentication token 108 to content providing device 110 continuously (e.g., each time seamless authentication device 104 authenticates first user 102). In other embodiments, seamless authentication device 104 may communicate information to content providing device 110 upon a determination that first user 102 is no longer authenticated.

In some embodiments, content providing device 110 may be handed off from first user 102 to second user 102. For example, second user 102 associated with second seamless authentication device 104 may enter a room and begin consuming content 112 from a television as first user 102 leaves the room. As another example, in embodiments where seamless authentication device 104 and content providing device 110 are combined, first user 102 may physically hand the combined seamless authentication device 104/content providing device 110 to second user 102.

Seamless authentication device 104 associated with second user 102 authenticates second user 102's identity in a similar manner as discussed in relation to first user 102 and content providing device 110 communicates content 112 to second user 102. In some embodiments, first user 102 and second user 102 may both receive content 112, and content providing device 110 may communicate content 112 in response to authentication token 108 associated with first user 102, authentication token 108 associated with second user 102, or both.

In some embodiments, first user 102 and second user 102 may consume identical or substantially similar content 112 at a similar time. In this embodiment, a first content providing device 110 communicates content 112 to first user 102 and a second content providing device 110 communicates content 112 to second user 102. This allows first user 102 and second user 102 to consume similar content 112 at a similar time using different content providing devices 110. For example, first user 102 may be associated with a first tablet and second user 102 may be associated with a second tablet. The two users 102 may view a movie on their respective tablets at the same time. More than two users 102 may utilize system 100. For example, in other embodiments, any suitable number of users 102 may consume similar content at a similar time.

In a further exemplary embodiment of operation, profile generation device 116 utilizes one or more authentication tokens 108 to generate individual profile 126 for user 102 and/or aggregate profile 128 for a group of users 102. Profile generation device 116 receives authentication token 108 and/or content 112 to generate profiles, in some embodiments. As discussed, authentication token 108 may include an identity of user 102, a location of user 102, a content providing device 110 associated with user 102, and/or an identification of seamless authentication device 104. Thus, individual profile 126 may include who is watching what content on what device at what location. In this exemplary embodiment, profile generation device 116 receives authentication token 108 from seamless authentication device 104 and/or content providing device 110. Profile generation device 116 receives an identification of content 112 from content providing device 110. Processor 120 applies rules 124 to authentication token 108 and/or content 112 (or an identification of content 112) to generate individual profile 126 for user 102.

In some embodiments, profile generation device 116 may determine that a group of users 102 are consuming content 112 at a same or similar location. For example, a group of users 102 may watch a weekly television program together. As another example, a group of users 102 may watch sporting events together. In this example, profile generation device 116 receives an authentication token 108 for each member of a group of users 102. Processor 120 applies rules 124 to determine that each member of the group is in a same or similar location. Processor 120 may apply rules 124 to generate aggregate profile 128 for the group in a similar way as discussed previously in relation to generating individual profiles 126.

In some embodiments, profile generation device 116 may generate targeted advertising 114 for user 102 or a group of users 102 based on profiles associated with the user 102 or group of users 102. Profile generation device 116 communicates targeted advertising 114 to content providing device(s) 110 before it is communicated to user(s) 102.

Modifications, additions, or omissions may be made to system 100 without departing from the scope of the disclosure. For example, seamless authentication device 104 may include any number of processors 206, memory 208, biometric scanners 204, and/or interfaces 202. Furthermore, the components of system 100 may be integrated or separated. For example, in particular implementations, memory 208 may be separated into multiple memories 208 to store the data described herein. As another example, seamless authentication device 104 may be located within content providing device 110, profile generation device 116, and/or any other suitable component of system 100.

Figure 3:
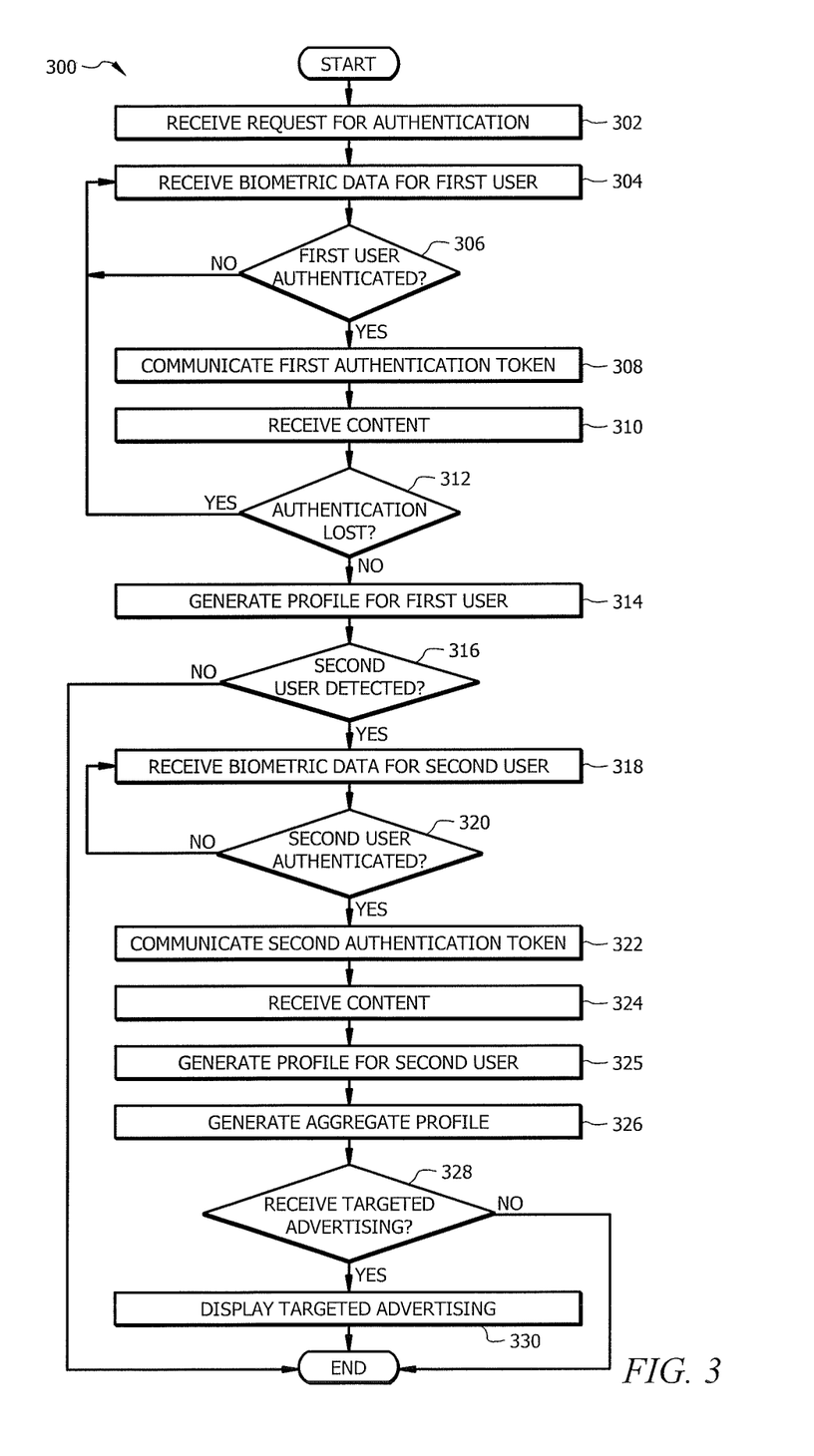
FIG. 3 is a flowchart illustrating a method for seamless authentication using the system of FIG. 1, in certain embodiments.

FIG. 3 is a flowchart illustrating method 300 for performing seamless authentication using system 100 of FIG. 1. Method 300 begins at step 302 where seamless authentication device 104 receives a request for authentication. For example, seamless authentication device 104 may receive a request for authentication from content providing device 110, user 102, or any other suitable component or person. The method proceeds to step 304 where seamless authentication device 104 receives biometric data for first user 102. For example, biometric scanner 204 may receive biometric data for user 102.

Seamless authentication device 104 may authenticate first user 102 at step 306. For example, processor 202 may compare predetermined biometric information 210 to identity information 212. If first user 102 is not authenticated in step 306, the method may proceed to step 304. Otherwise, seamless authentication device 104 generates first authentication token 108 and communicates first authentication token 108 to content providing device 110 at step 308. User 102 receives content 112 from content providing device 110 in response to communicating first authentication token 108 at step 310.

Seamless authentication device 104 may continuously authenticate first user 102, as previously discussed. If seamless authentication device 104 determines that authentication for first user 102 is lost at step 312, the method proceeds to step 304. Otherwise the method proceeds to step 314 where profile generation device 116 generates individual profile 126 for first user 102 using authentication token 108 and/or content 112.

Content providing device 110, profile generation device 116, and/or any other component of system 100 determines whether second seamless authentication device 104 is detected at 316. For example, second user 102 associated with second seamless authentication device 104 may be at a same or similar location as first user 102. In this example, second seamless authentication device 104 may federate second authentication token 108, and content providing device 110 may receive second authentication token 108 to detect second seamless authentication device 104. If second seamless authentication device 104 is not detected, the method ends. Otherwise the method proceeds to step 318 where second seamless authentication device 104 receives biometric data for second user 102. Second seamless authentication device 104 determines whether second user 102 is authenticated as previously discussed in relation to authenticating first user 102. If second user 102 is not authenticated, the method may proceed to step 318. Otherwise, the method may proceed to step 322.

Second seamless authentication device 104 generates authentication token 108 for second user 102 and communicates second authentication token 108 at step 322. Second user 102 receives content 112 in response to second authentication token 108 at step 324. Profile generation device 116 may generate individual profile 126 for second user 102 at step 325. Profile generation device 116 generates aggregate profile 118 for first user 102 and second user 102 at step 326. For example, profile generation device 116 may generate aggregate profile 128 using first authentication token 108 associated with first user 102 and second authentication token 108 associated with second user 102. Profile generation device 116 determines whether to generate targeted advertising 114, and content providing device 110 and/or seamless authentication device 104 determines whether it receives targeted advertising 114 at step 328. If content providing device 110 and/or seamless authentication device 104 does not receive targeted advertising 114 at step 328, the method ends. Otherwise content providing device 110 displays targeted advertising 114 for first user 102 and/or second user 102 before the method ends.

Modifications, additions, or omissions may be made to method 300 depicted in FIG. 3. Method 300 may include more, fewer, or other steps. While discussed as specific components completing the steps of method 300, any suitable component of system 100 may perform any step of method 300. As another example, method 300 describes two users 102 utilizing system 100. One user 102 may utilize system 100 or any suitable number of users may utilize system 100. Furthermore, aggregate profile 128 may include information for any suitable number of users 102. While described as method 300 generating or revising individual profile 126 for first user 102, individual profile 126 for second user 102, and aggregate profile 128. Method 300 may generate or revise some, none, or all, of profile 126 for first user 102, individual profile 126 for second user 102, and aggregate profile 128.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The invention claimed is:

1. An authentication system comprising:
a first authentication device comprising:
 a first biometric scanner;
 a first processor communicatively coupled to the first biometric scanner;
 a first interface communicatively coupled to the first processor; and
 a memory storing instructions that, when executed by the first processor, cause the first processor to perform operations comprising
  receiving, via the first biometric scanner, biometric data for a first user,
  authenticating an identity of the first user by comparing the biometric data for the first user to predetermined biometric information for the first user,
  generating a first authentication token in response to authenticating the identity of the first user,
  communicating, via the first interface, the first authentication token to a first content providing device that is different from the first authentication device, wherein the first authentication token indicates that the identity of the first user is confirmed, and wherein the first user receives content directly from the first content providing device in response to the first content providing device receiving the first authentication token from the first authentication device,
  determining, while the first user is consuming the content via the first content providing device, a change in location of the first authentication device, and
  in response to determining a change in location of the first authentication device, re-authenticating the identity of the first user.

2. The authentication system of claim 1, further comprising a profile generation device configured to generate a profile for the first user based on the identity of the first user, the first content providing device, and the content.

3. The authentication system of claim 2, wherein at least part of the profile is stored in a block chain.

4. The authentication system of claim 1, further comprising:
a second authentication device comprising:
 a second biometric scanner;
 a second processor communicatively coupled to the second biometric scanner;
 a second interface communicatively coupled to the second processor; and
 a memory storing instruction that, when executed by the second processor, cause the second processor to perform operations comprising
  receiving, via the second biometric scanner, biometric data for a second user,
  authenticating an identity of the second user by comparing the biometric data for the second user to predetermined biometric information for the second user,
  generating a second authentication token in response to authenticating the identity of the second user, and
  communicating, via the second interface, the second authentication token to the first content providing device, wherein the second authentication token indicates that the identity of the second user is confirmed, and wherein the second user receives the content directly from the first content providing device in response to the first content providing device receiving the second authentication token from the second authentication device.

5. The authentication system of claim 4, further comprising the first content providing device and a second content providing device.

6. The authentication system of claim 4, further comprising a profile generation device configured to generate an aggregate profile based on the identity of the first user, the identity of the second user, the first content providing device, and the content.

7. The authentication system of claim 6, wherein the first content providing device is configured to:
receive targeted advertising from the profile generation device, the targeted advertising based on the aggregate profile; and
display the targeted advertising.

8. The authentication system of claim 1, wherein the first biometric scanner comprises at least one of a fingerprint scanner, a retina scanner, a heart rate monitor, a facial recognition device, a voice print scanner, a gesture recognition camera, a height determination device, and a walking gait authentication device.

9. The authentication system of claim 1, wherein the identity of the first user is re-authenticated by receiving additional biometric data.

10. A method comprising:
- receiving, by a first authentication device, using a first biometric scanner of the first authentication device, biometric data for a first user;
- authenticating, by the first authentication device, an identity of the first user by comparing the biometric data for the first user to predetermined biometric information for the first user;
- generating, by the first authentication device, a first authentication token in response to authenticating the identity of the first user;
- communicating, via a first interface of the first authentication device, the first authentication token to a first content providing device that is different from the first authentication device, wherein the first authentication token indicates that the identity of the first user is confirmed, and wherein the first user receives content directly from the first content providing device in response to the first content providing device receiving the first authentication token from the first authentication device;
- determining, by the first authentication device, while the first user is consuming the content via the first content providing device, a change in location of the first authentication device; and
- in response to determining a change in location of the first authentication device, re-authenticating, by the first authentication device, the identity of the first user.

11. The method of claim 10, further comprising generating, using a profile generation device, a profile for the first user based on the identity of the first user, the first content providing device, and the content.

12. The method of claim 11, wherein at least part of the profile is stored in a block chain.

13. The method of claim 10, further comprising:
- receiving, by a second authentication device, using a second biometric scanner of the second authentication device, biometric data for a second user;
- authenticating an identity of the second user by comparing the biometric data for the second user to predetermined biometric information for the second user;
- generating a second authentication token in response to authenticating the identity of the second user; and
- communicating, via a second interface of the second authentication device, the second authentication token to the first content providing device, wherein the second authentication token indicates that the identity of the second user is confirmed, and wherein the second user receives the content directly from the first content providing device in response to the first content providing device receiving the second authentication token from the second authentication device.

14. The method of claim 13, further comprising generating an aggregate profile for the first user and the second user based the identity of the first user, the identity of the second user, the first content providing device, and the content.

15. The method of claim 14, further comprising receiving targeted advertising based on the aggregate profile.

16. The method of claim 10, wherein the first biometric scanner comprises at least one of a fingerprint scanner, a retina scanner, a heart rate monitor, a facial recognition device, a voice print scanner, a gesture recognition camera, a height determination device, and a walking gait authentication device.

17. The method of claim 10, wherein the identity of the first user is re-authenticated by receiving additional biometric data.

18. A content providing device comprising:
- an interface;
- a display;
- a processor communicatively coupled to the interface; and
- a memory storing instructions that, when executed by the processor, cause the processor to perform operations comprising
  - receiving, from a user, a request to display content,
  - communicating a request for authentication of an identity of the user to an authentication device that is different from the content providing device,
  - receiving, from the authentication device, an authentication token for the user in response to the request for authentication of the identity of the user, the authentication token indicating that the identity of the user is confirmed,
  - displaying, via the display, the content for at least the user in response to the authentication token being received, and
  - receiving, from the authentication device, a new authentication token for the user in response to re-authentication of the user performed by the authentication device in response to a change of location of the authentication device while the user is consuming the content.

19. The content providing device of claim 18, wherein the display is one of a television, a smartphone, a tablet, a laptop computer, and a desktop computer.

* * * * *